United States Patent [19]
Grenon et al.

[11] Patent Number: 6,064,862
[45] Date of Patent: May 16, 2000

[54] METHOD AND APPARATUS FOR EXTERNAL BAND SELECTION OF A DIGITAL MICROWAVE RADIO

[75] Inventors: Jean Francois Grenon, Seattle, Wash.; Patric McDonald, Granite Bay, Calif.

[73] Assignee: Innova Corporation, Seattle, Wash.

[21] Appl. No.: 08/897,012

[22] Filed: Jul. 18, 1997

[51] Int. Cl.$^7$ .................................................. H04B 1/40
[52] U.S. Cl. ............................ 455/73; 455/77; 333/126; 375/284
[58] Field of Search .................................. 455/73, 77, 78, 455/80, 82, 90, 562; 333/126, 135, 209, 208, 219, 125, 137; 342/362; 375/284, 286

[56] References Cited

U.S. PATENT DOCUMENTS

| | | | |
|---|---|---|---|
| 4,006,416 | 2/1977 | Pastan et al. | 375/284 |
| 4,427,953 | 1/1984 | Hudspeth et al. | 333/134 |
| 4,783,639 | 11/1988 | Hudspeth et al. | 333/126 |
| 4,920,351 | 4/1990 | Bartlett et al. | 333/126 X |
| 4,937,533 | 6/1990 | Livingston | 333/126 |
| 4,968,957 | 11/1990 | Hudspeth et al. | 333/126 |
| 4,970,480 | 11/1990 | Wong et al. | 333/135 |
| 5,220,679 | 6/1993 | Zametzer et al. | 455/82 |

*Primary Examiner*—Dwayne D. Bost
*Assistant Examiner*—Tracy M. Legree
*Attorney, Agent, or Firm*—Graham & James LLP

[57] ABSTRACT

The system and method of the present invention facilitates the selection of a portion of an operating bandwidth and frequency of a digital microwave radio. The components include a transceiver mounted to a mounting plate having waveguide ports. The input and output of the receiver and transmitter portions of the transceiver module occur through the two waveguide ports of the plate. A diplexer inserted within the slot of an interface is externally mounted in relation to the mounting plate and to transceiver unit. The microwave energy from the transceiver module is coupled through the mounting plate, diplexer, interface and antenna. Because of the external mounting arrangement of the diplexer, interface, selecting an operating portion of the available bandwidth may occur after complete manufacture of the digital microwave radio.

26 Claims, 10 Drawing Sheets

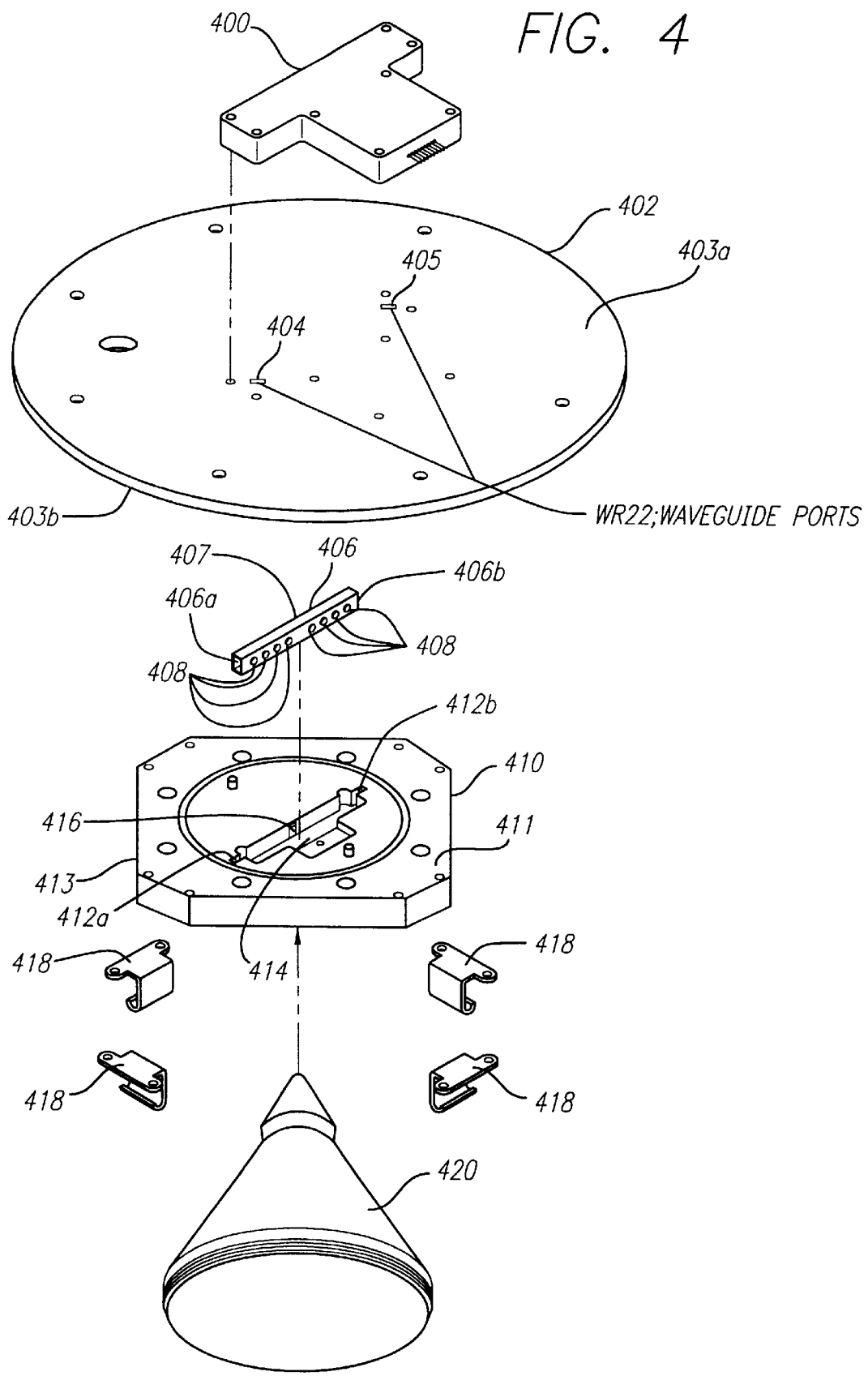

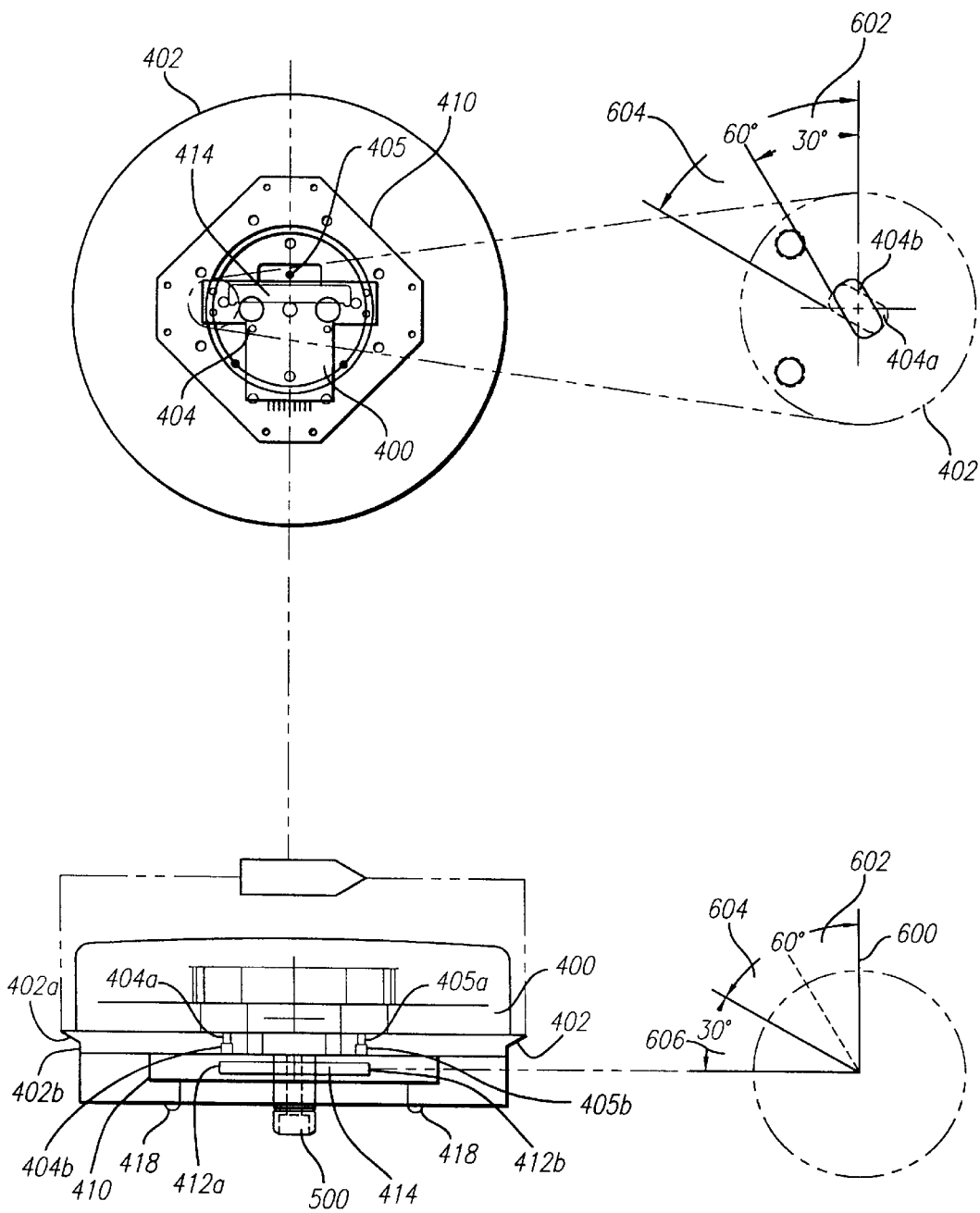

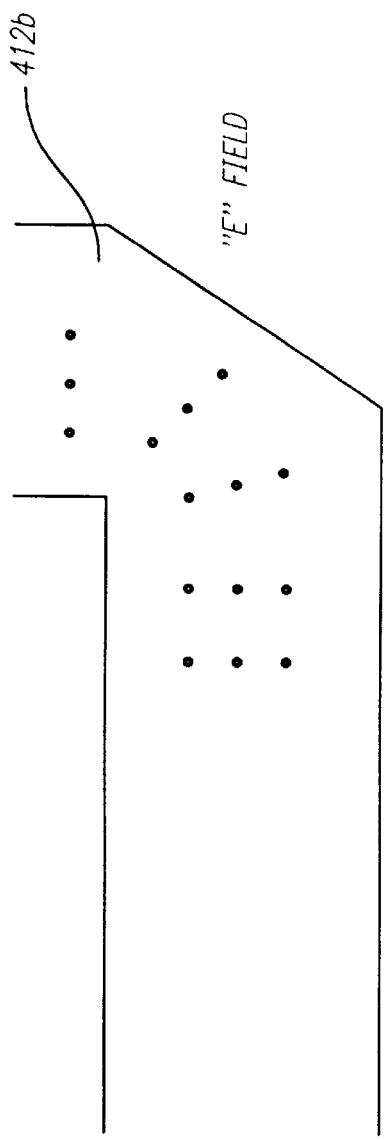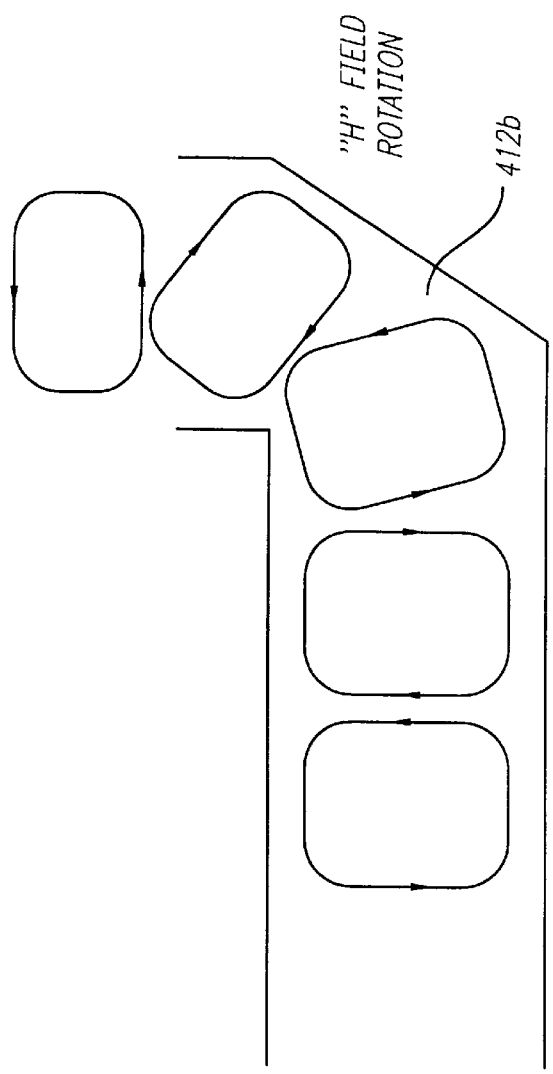
FIG. 9

METHOD AND APPARATUS FOR EXTERNAL BAND SELECTION OF A DIGITAL MICROWAVE RADIO

TECHNICAL FIELD OF THE APPLICATION

This invention relates generally to a method and apparatus for facilitating band selection on a digital microwave radio, and more specifically, to a method and apparatus for facilitating band selection with a diplexer that is externally mounted in relation to the transceiver of a digital microwave radio.

BACKGROUND OF THE INVENTION

Digital microwave radios have become particularly advantageous in a number of key types of communication. High frequency point to point communications are used by, among others, cellular operators, telecommunications operators, private network operators, governments, and large telecommunications operations.

Typical of conventional digital microwave radios is the use of a separate transmitter (TX) module and a separate receiver (RX) module. Although conventional radios have the ability to tune over a vast frequency range, the problems caused by interaction between the TX and RX modules necessitate limiting that range. Limiting the range is necessary due to two factors. First, the sensitivity of the circuitry of the RX module, and the common use of an antenna by both the TX and RX modules, mandate separation of the passbands for RX and TX filters to prevent TX power from interfering with the RX module. Interference with the RX module will generally cause saturation and intermodulation products. Second, image frequencies presented at the antenna port can generate RX interference. Thus, it is necessary to use band limiting filters to reject the image frequencies. Image frequencies are located at either plus or minus twice the first intermediate frequency from the desired receiver frequency.

Conventional digital microwave radios, as shown in FIG. 1, include a filter assembly 107 mounted within radio enclosure 100. Although, the filter assembly 107 including a TX filter 106, circulator 108 and RX filter 114 may facilitate selection of a specific frequency range, placement of the filter assembly 107 within the enclosure 100 subjects the manufacture, installation and implementation of the radio to numerous limitations. One limitation is that tuning conventional digital microwave radios to a set frequency range must occur during the manufacturing process. Another limitation is that retuning a conventional digital microwave radio requires the difficult and costly process of disassembling the radio, replacing and adjusting the filter assembly 107, and reassembling the radio. Particularly due to the complexity of the retuning process, a technician will likely need to remove the radio from a client's site to perform the channel modifications at a manufacturer's site. Another limitation is that due to the configuration of a conventional radio, tuning the radio to a specific operational bandwidth generally requires replacement or removal of a plurality of parts such as waveguide elbows.

Returning to FIG. 1, typically a conventional digital microwave radio includes TX 102 and an RX 110 modules that have a waveguide flange (104 & 112) at either end of a common circulator 108 and separate internal filters (106 & 114). Generally the output of the circulator 108 is offset 90 degrees from the centerline of the branching filter assembly 107.

The branching filter assembly 107 radio is generally configured in a collinear assembly, although the branching filter assembly 207 of other conventional digital microwave radios, as shown in FIG. 2, may be configured in a U-shaped assembly. FIG. 2 shows an example of other conventional digital microwave radios that include waveguide elbows (205 & 209), and an RX module 210 and a TX module 202 with each correspondingly mounted to separate flanges 212 and 204.

The angle of each waveguide and the dimensions of the waveguide elbows are chosen to cause a specific polarization effect for coupling the power of the microwave signal. For example, FIG. 2 shows a radio providing two waveguide elbows with 90 degree angles to couple the power of the microwave signals. In FIG. 1, the circulator 108 provides an RX and TX interface at 90 degrees toward the centerline of the antenna 116, and in FIG. 2, the circulator 208 similarly provides an RX and TX interface at 90 degrees toward the centerline of the antenna 216.

The mechanical mounting arrangement of the conventional digital microwave radios of FIG. 1 and FIG. 2 subject the manufacture of radios to a number of limitations. For example, the mounting arrangements of conventional radios generally are too large to encase these radios in compact enclosures. Further, the TX and RX modules of conventional radios may not be mounted to a common heat sink. Further, since conventional radios include numerous components such as wageguide elbows and circulators, it is a costly process to manufacture conventional radios. Still further, retuning a conventional radio requires the costly modification or replacement of a plurality of components. For instance, tuning a conventional radio may require modification or replacement of components such as the filters, waveguide elbows and circulators ( See FIGS. 1 and 2).

As a result, there has been a longfelt need for a digital microwave radio which includes a mechanical mounting arrangement that avoids the need for large unit enclosures, and the costly and timely process of retuning a radio at a manufacture site that generally includes modifying or replacing a plurality of components internally assembled within the radio enclosure—requirements long associated with conventional digital microwave radios.

SUMMARY OF THE INVENTION

The present invention substantially improves on the prior art digital microwave radio's method and apparatus used for selecting and subsequently changing the operating frequency and bandwidth of a radio unit. The system and method of the present invention provides an externally mounted diplexer and waveguide transformers which include unique tuning and polarizing steps to select a portion of a bandwidth.

In particular, the digital microwave radio of the present invention includes components mounted within an environmentally protected enclosure. The components include a transceiver module mounted to a mounting plate having waveguide ports. The input and output of the receiver and transmitter portions of the transceiver module occur through the two waveguide ports of the plate. A diplexer inserted within the slot of an interface are externally mounted in relation to the mounting plate and to the transceiver unit. The microwave energy input to and output from the transceiver module is coupled through the mounting plate, diplexer and interface. The energy is then coupled to the radio's antenna by a rectangular to circular waveguide transition when exiting from the underside of the interface to the antenna.

It will be appreciated from the foregoing that a significant aspect of the present invention is the ability to externally mount the diplexer unit, including the diplexer and interface, in relation to the mounting plate and the transceiver unit. Because of the external mounting arrangement of the diplexer and interface, selecting an operating portion of the available bandwidth may occur after complete manufacture of the digital microwave radio. This permits radio manufacturers to inventory digital microwave radios before adding the diplexer unit. Once a customer informs the manufacturer of the assigned bandwidth or channel, the manufacturer may externally mount the diplexer that corresponds to the selected operating portion of the bandwidth. This simplifies, expedites, and reduces the per unit costs of the radio manufacturing process.

Further, manufacturers may efficiently install a radio with a customer's bandwidth specifications, since tuning requires only the installation or adjustment of the externally mounted diplexer and, perhaps, the associated interface. Particularly, the diplexer may be pre-tuned and stored in a warehouse, so that it may be rapidly installed before shipment to a customer.

Still further, the present invention permits operation of the transceiver and mounting plate of the digital microwave radio with a variety of diplexers of different operating bandwidths and center frequencies.

Still further, the present invention permits operation of the digital microwave radio with fewer components than conventional radios, thereby facilitating use of a small enclosure to encase the transceiver. The present invention replaces conventional waveguide flanges with waveguide output ports in the mounting plate and a waveguide transformer in the interface. Also, because an offset between the transceiver and waveguide ports, offset between the portions of the waveguide ports, and top of the waveguide transformers rotate the polarization of microwave signals, the present invention does not include separate and costly waveguide elbows of the prior art. (See FIG. 2)

Moreover, because the transmitter and receiver are not separate modules and are accordingly co-planar, the configuration facilitates thermal conduction to one heat sink.

The invention may be better appreciated from the following Figures, taken together with the accompanying Detailed Description of the Invention.

BRIEF DESCRIPTION OF THE DRAWINGS

The invention will now be described with reference to the accompanying drawings, wherein:

FIG. 4 shows an exploded view of the microwave digital radio of FIG. 3.

FIG. 6(a) shows a top view of the digital microwave radio of FIG. 3 that displays the rotation of the polarization of the microwave signal caused by the offset of the transceiver to the top portion of the waveguide ports and the relative offset between the top and bottom portions of each waveguide port of the mounting plate.

FIG. 6(b) shows a cross view of the digital microwave radio of FIG. 3 that identifies the rotation of the polarization of the microwave signal caused by the top of the waveguide transformer of the interface slot of FIG. 4.

FIG. 9 shows the rotation of the electric field and magnetic field due to a 45 degree magnetic field bend transition, such as provided by the waveguide transformer.

DETAILED DESCRIPTION OF A PREFERRED EMBODIMENT

The following description is of the best presently contemplated mode of carrying out the invention. The description is made for the purpose of illustrating the general principles of the invention and is not to be taken in a limiting sense.

Figure 1:
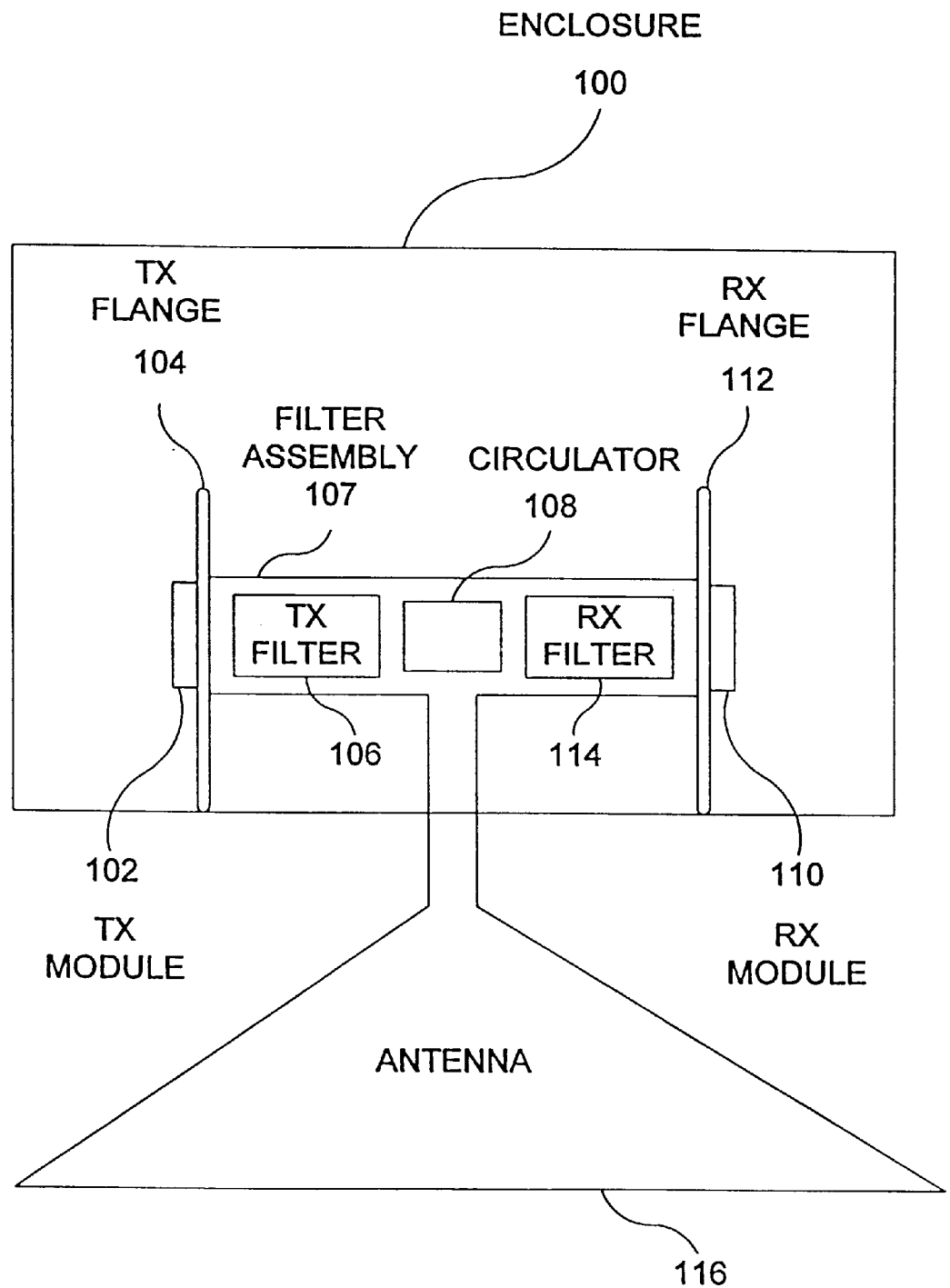
FIG. 1 shows a diagram of a conventional digital microwave radio with a collinear filter assembly.
Figure 2:
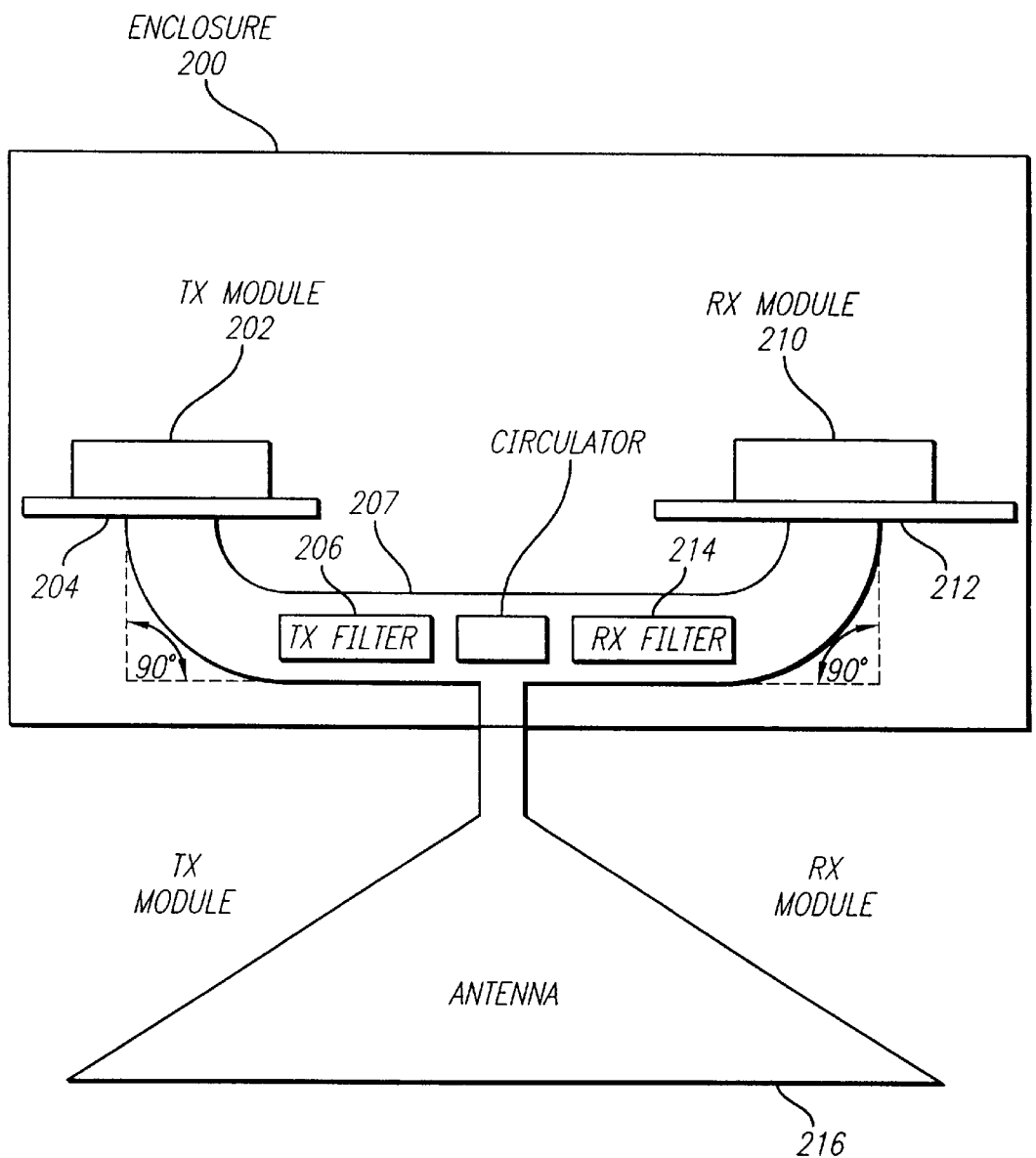
FIG. 2 shows a diagram of a conventional digital microwave radio with a filter assembly and two waveguide elbows.
Figure 3:
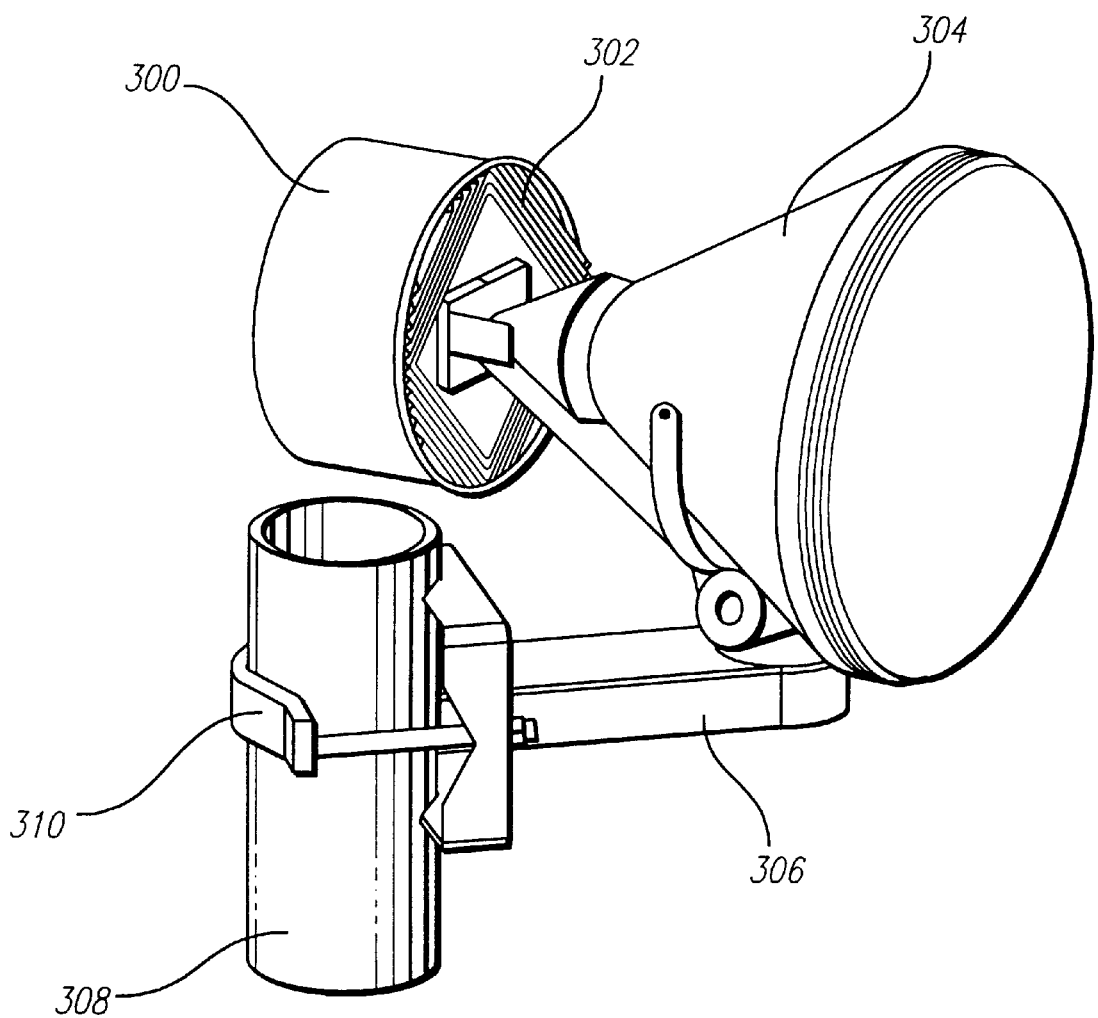
FIG. 3 shows an external perspective view of a microwave digital radio in accordance with the present invention.

Referring first to FIG. 3, an external perspective view of a microwave digital radio system may be generally appreciated. In particular, a preferred embodiment of an outdoor unit of the microwave digital radio and an antenna installation is shown. An example of an antenna, a horn antenna 304, is shown in FIG. 3. However, other embodiments of the present invention may include other types of antenna. A transceiver (not shown) attached to a mounting plate (not shown) is mounted within an enclosure 300. An interface 302 attaches the enclosure 300 to an antenna 304. The mounting bracket 306 mounts the microwave digital radio system as described herein on either a horizontal or vertical pipe 308. A V-bolt 310 is used to secure the mounting bracket 306 to a pole 308. It will become apparent to those skilled in the art, given the teachings herinafter provided, that the microwave digital radio system of FIG. 3 includes a mechanical arrangement of components that facilitates selection of an operating bandwidth and allows for encasing the digital microwave radio within a compact system enclosure.

Referring next to FIG. 4, an exploded view of the microwave digital radio system in accordance with the present invention may be better appreciated. From the top of FIG. 4, a transceiver module 400, including a transmitter (TX) (not shown) and a receiver (RX) (not shown) is mounted to the topside 403a of a mounting plate 402. In a preferred embodiment, the present invention employs a common oscillator for both TX and RX. The mounting plate 402 includes waveguide ports (404 & 405), each including a corresponding top portion (404a & 405a) and a corresponding bottom portion (404b & 405b)—See FIGS. 6b & 8—. In a preferred embodiment the thickness of the mounting plate 402 is 0.375 inches. The two waveguide ports (404 & 405) are co-planar and are WR22 waveguide ports. The waveguide ports (404 & 405) are positioned a predefined distance in parallel from each other within the mounting plate 402. The waveguide ports (404 & 405) provide a cost effective method of axially rotating the polarization of the transmit and receive microwave signals. The transceiver 400 directs the output of the transmitter and input of the receiver through the waveguide ports (404 & 405). Although in a preferred embodiment one waveguide port is assigned to the transmitter and the other to the receiver, either port may be assigned to receive the input of the RX or the output of the TX.

The diplexer 406 and interface 410 are mounted externally in relation to the enclosure 300, whereas the transceiver 400 is mounted within. The function of the diplexer 406 and interface 410, in substantial measure, are to tune the digital microwave radio to a selected portion of the radio's available bandwidth and operating frequency. For example, in a preferred embodiment, the bandwidth that the components operate over ranges from 37 to 40 GHz. The operating bandwidth of the waveguide components is 3000 MHz with a center frequency of approximately 38.5 GHz. The diplexer may, in a preferred embodiment, limit the digital microwave radio to operate within a bandwidth as narrow as 300 MHz. It should, however, be apparent to those skilled in the art that other frequencies are possible where components, particularly the interface 400 and diplexer 406, have different scaled dimensions.

The external mounting of the diplexer 406 and interface 410 facilitates the selection of a digital microwave radio's operating bandwidth and center frequency after the complete manufacture of the radio. Because of the external location of these components, the diplexer 406 and interface 410 which tune a digital microwave radio to a specific operating bandwidth may be installed at a client's site.

The dimensions of the diplexer 406 and the number, type and positioning of the resonating screws 408 installed within the diplexer establish the diplexer's operating bandwidth and frequency. The position of the tuning screws are determined by theory which is well known by one skilled in the art and can be found in the reference text, *Microwave Filters, Impedance-Matching Networks, and Coupling Structures* by Mathaei, Young and Jones, Artech House 1964. A preferred embodiment of the present invention includes a diplexer with the standard WR22 dimensions of 0.112 inches by 0.224 inches. Eight resonating screws, also known as tuning screws, are installed along a side of the diplexer 406. The screws separate the transmit and receive microwave signals, where four screws tune the transmit frequency and the other four screws tune the receive frequency. The diplexer provides isolation between the transmit and receive frequencies with an example difference of 700 MHz. The amount of out-of-band insertion loss of the diplexer 406 depends upon the number of resonators 408.

The resonating screws 408 assigned to the receiver bandwidth filter out interference and other unnecessary signals from the antenna 420. The resonating screws assigned to the transmit bandwidth filter the transmit bandwidth spectrum.

The diplexer 406 includes three waveguide ports, one on each end of the diplexer (406a & 406b) and the third waveguide port 407 along a side of the diplexer 406 which is spaced in relation to the resonating screws 408. The dimensions of the diplexer 406 fit into the slot 414 of the interface 410. The diplexer 406 is set into the slot 414 so that its third wave guide port 407 is aligned with the waveguide inlet 416 of the interface 410. The upwardly facing side 411 of the interface 410 is mounted to the lower facing side 403b of the mounting plate 402. One of ordinary skill in the art will understand that mounting occurs along the semi-circular apertures of the interface 410 and mounting plate 402 that are shown in FIG. 4.

Figure 8:
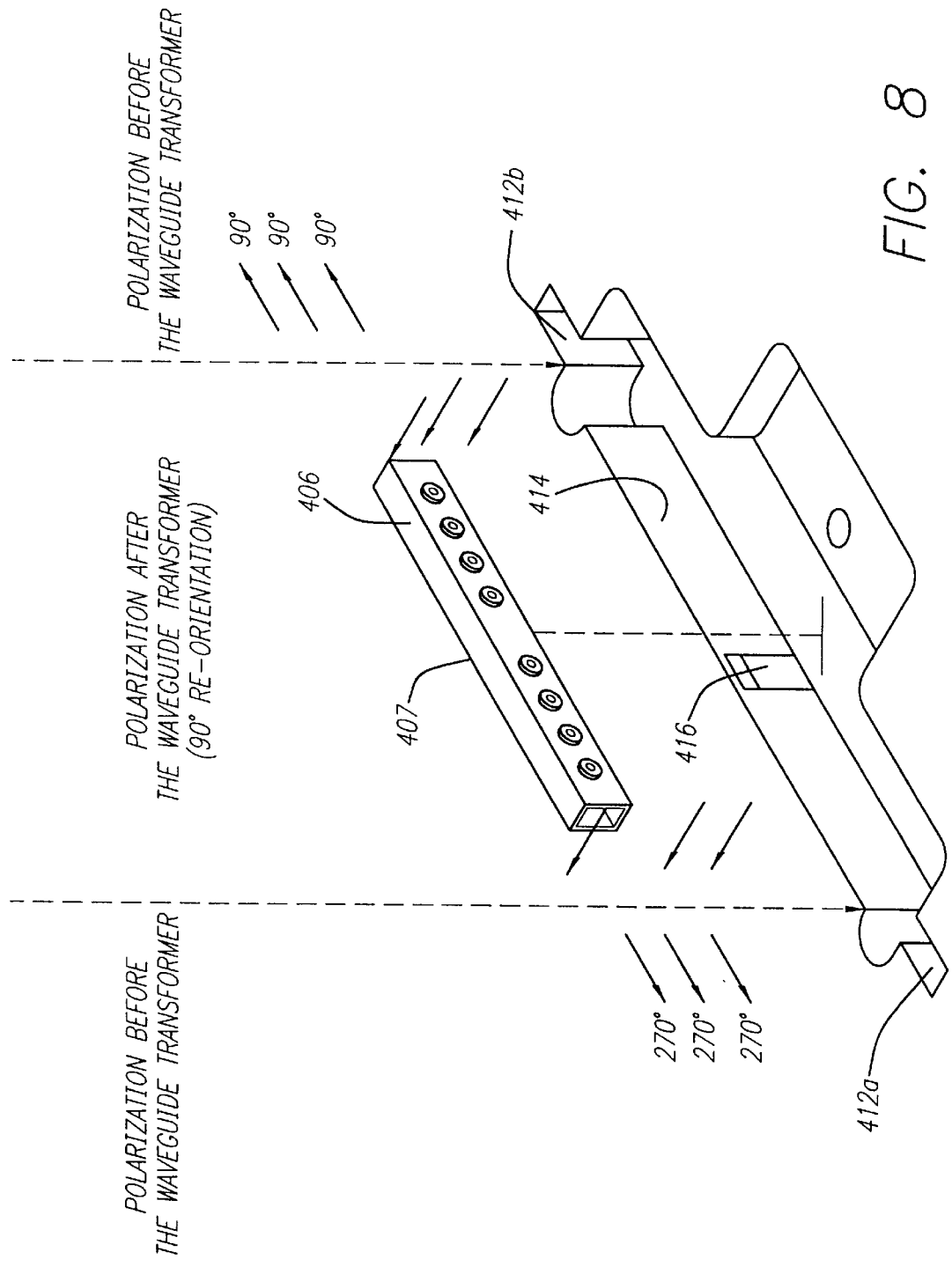
FIG. 8 shows an expanded view of the reorientation of the microwave signal polarization by 90 degrees caused by the waveguide transformer of the interface slot of FIG. 4.

The slot 414 of the interface 410, also shown in FIG. 8, includes two beveled ends, wherein each have angles that form a waveguide transformer (412a & 412b). In a preferred embodiment, each beveled angle of 45 degrees forms a waveguide transformer. In a preferred embodiment, the antenna 420 is a horn antenna. A plurality of clip retainers 418 connect the antenna 420 to the lower facing side 413 of the interface 410.

Figure 5A:
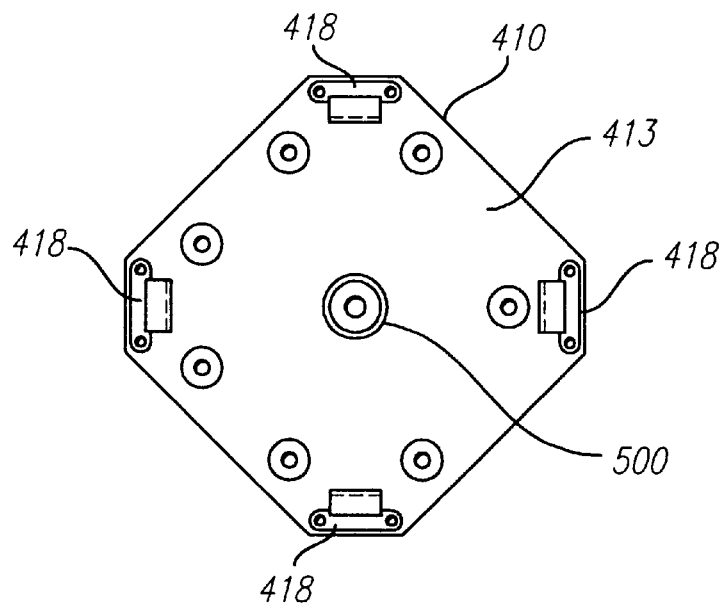
FIG. 5(a) shows a bottom view of the interface of the microwave digital radio of FIG. 3.
Figure 5B:
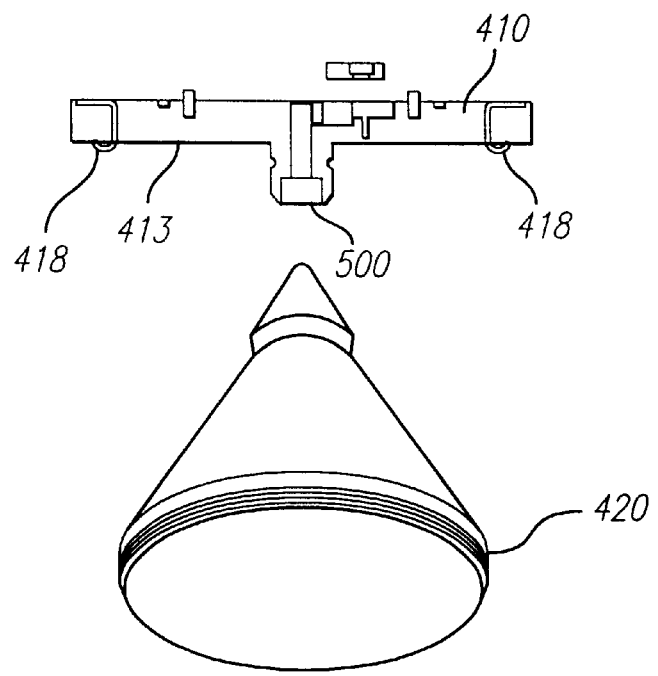
FIG. 5(b) shows a cross view of the interface and the antenna of the microwave digital radio of FIG. 3.

Referring next to FIGS. 5(a) and 5(b), the connection between the interface 410 and the antenna 420 may be understood in greater detail. Where appropriate, like elements may be shown with like reference numbers. Particularly, FIG. 5(a) shows the lower facing side 413 of the interface 410. Along four edges of the lower facing side 413 of the interface 410, clip retainers 418 connect the antenna 420 to the interface 410. At the center of the lower facing side 413, a nipple interface port 500 continues through to the waveguide inlet 416.

FIG. 5(b) shows a side view of the interface 410, and the clip retainers 418 used to connect the antenna 420 to the lower facing side 410 of the microwave digital radio of FIG. 3. The output to the antenna and the input to the digital microwave radio are provided via the nipple interface port 500.

With the description of a preferred embodiment of the digital microwave radio herein above provided, the following describes the general flow of a TX and RX microwave signals using the digital microwave radio system of the present invention.

The microwave input and output of the transceiver module 400 occurs through the waveguide ports (404 & 405) of the mounting plate. Energy to and from the transceiver module 400, after passing through the mounting plate, is coupled to the waveguide transformers (412a and 412b). In a preferred embodiment, one of the waveguide ports and one of the waveguide transformers in a parallel spaced relation are assigned to couple the energy of the TX signal and the other to couple the energy of the RX signal. For example, in an embodiment of the present invention, the waveguide port 404, waveguide transformer 412a, and waveguide port 406a of the diplexer 406 are assigned to RX, and the waveguide port 404b, waveguide transformer 412b, and waveguide port 406b of the diplexer 406 are assigned to TX. This example is provided solely for illustrative purposes and should not be construed in a limiting sense.

Now in particular to the TX and RX port assignments of the embodiment described above, the energy of the TX signal is coupled through the waveguide port 405, to the waveguide transformer 412b and though the waveguide port 406b of the diplexer 406. The energy of the TX signal is then coupled though the third waveguide port 407 of the diplexer 406 and through the waveguide inlet 416 of the interface 410 through the nipple interface port 500 and lastly exiting from the antenna 420. The energy of the RX signal follows a reversed order of the coupling flow described above and uses the corresponding one of each pair of ports.

Referring next to FIGS. 6(a) and 6(b), a top view and a cross view of the digital microwave radio of FIG. 3 identify the microwave signal polarization rotation used to couple the energy along the components of the digital microwave radio of the present invention. In particular, the top view of the digital microwave radio is overlaid so that each component including interface 410, the interface slot 414 below the transceiver module 400 mounted upon the mounting plate 402 may be observed within the Figure. Also, the co-planar waveguide ports (404 & 405) of the mounting plate 402 are shown.

In order to couple the energy of TX and RX though the digital microwave radio, a 90° rotation of the polarization of the microwave signal is required. Rather than use costly flexible waveguide to provide 90 degrees of rotation of the polarization, the present invention uses an inexpensive apparatus and method. One skilled in the art will understand that the polarization of the TX output and RX input is linear.

Now with regard to a TX example, which also applies to the RX but in reverse, a 30° radial offset from reference position 600 of the TX port to the top portion 405a of the waveguide port 405 of the mounting plate 402 provides the first 30° polarization rotation 602. A 30° offset between the top portion 405a of the waveguide port 405 of the mounting plate 402 and the bottom portion 405b of the waveguide port 405 of the mounting plate 402 provides the second thirty degree polarization rotation 604. The top of the waveguide transformer 412b, that in a preferred embodiment is a beveled angle of 45 degrees, provides the third thirty degree rotation 606. Hence, the linear polarization of the microwave signal is rotated a total of 90 degrees from the vertical position. One skilled in the art will understand that the rotation for RX similarly follows the steps described above, but only in reverse. Further, the example provided above is for illustrative purposes only, and should not be construed to limit the invention. Thus, either sets of ports may be used to couple the energy of the RX or TX microwave signals.

Figure 7A:
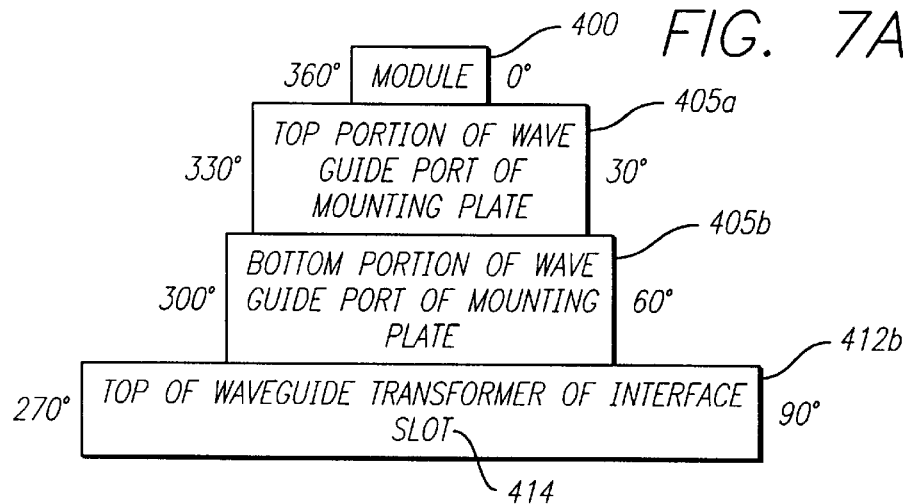
FIG. 7(a) shows an overview block diagram of the microwave signal polarization rotation caused by three sections of waveguide and by two waveguide transitions of the microwave digital radio of FIG. 3.
Figure 7B:
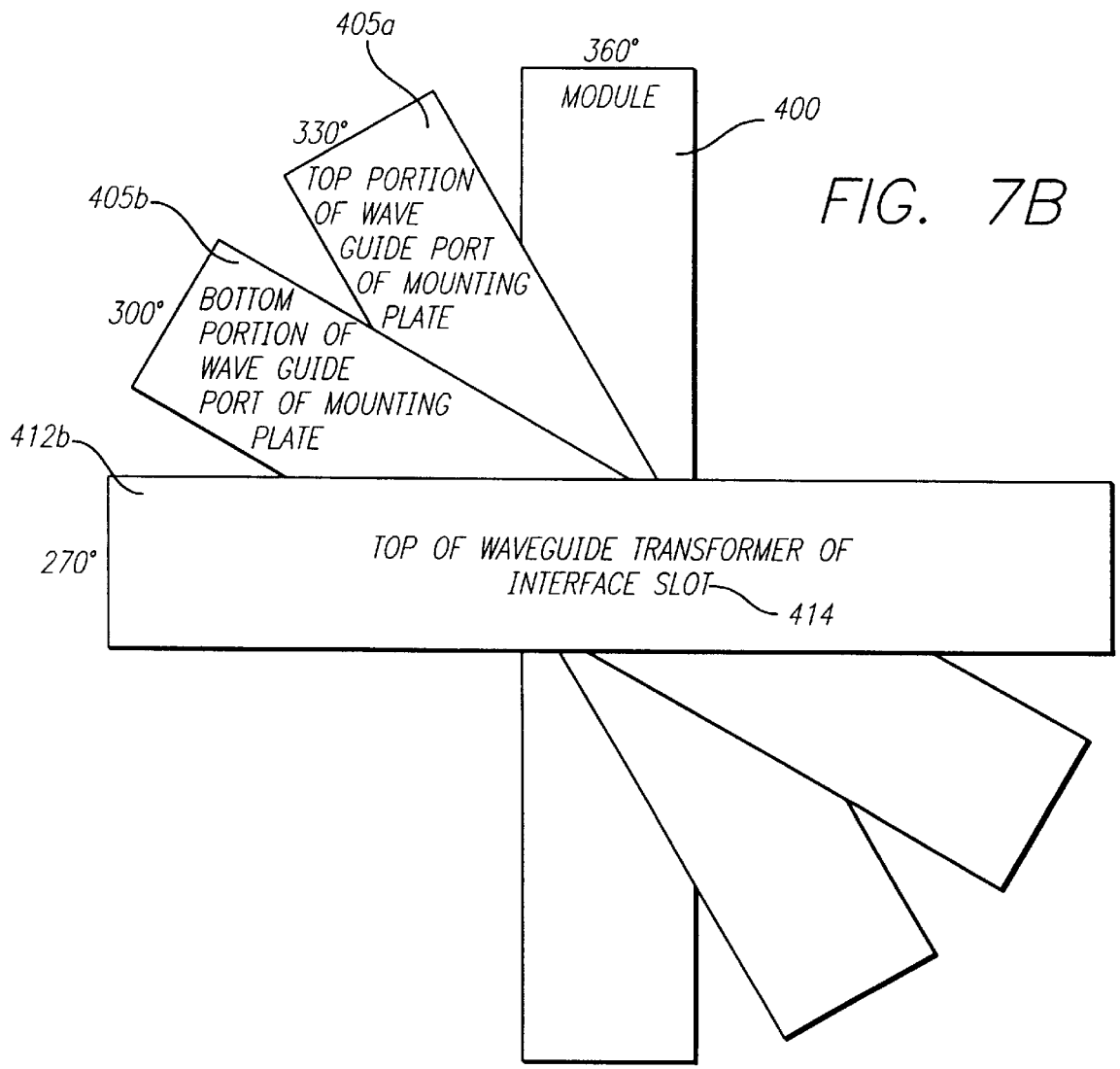
FIG. 7(b) shows an overview diagram of an example clockwise rotation of the microwave signal polarization of FIG. 5(a).

Referring next to FIGS. 7(a) and 7(b), the rotation of the microwave signal polarization may be understood in greater detail. First, it should be noted that the present invention may rotate the polarization in either a clockwise or counterclockwise direction for either sets of ports. Therefore, FIG. 7(a) shows that if the rotation is counter-clockwise the 90 degree rotation shifts the polarization from 360 degrees to 270 degrees, and if the rotation is clockwise the 90 degree rotation shifts the polarization from 0 to 90 degrees. In particular to FIG. 7(a), each block depicts where the polarization rotation to couple energy through the digital microwave radio occurs. For example, the linear polarization shifts 30 degrees for each of the following: the top portion 405a of the waveguide port 405 of the mounting plate 402; the bottom portion 405b of the waveguide port 405 of the mounting plate 402, and the top of the waveguide transformer 412b of the interface slot 414. In particular to FIG. 7(b), each block depicts the actual rotation of the linear polarization. One skilled in the art will understand that the other waveguide ports, including the top portion 404a of the waveguide port 404, bottom portion 405a of the waveguide port 405, and the top of the waveguide transformer 412a of the interface slot 414 provide a rotation of the polarization, as described herein above, equal in magnitude to that provided by the corresponding ports.

As described herein above, the direction of the linear polarization of the TX microwave signal after the top of the waveguide transformer 412b of the interface slot 414 is 270 degrees and is co-planar to the upwardly facing side of the interface 414. However, to couple the energy of the TX microwave through the diplexer 404 to the third waveguide port 407, requires the polarization to reorient from a horizontal to a vertical plane at 270 degrees.

Figure 7C:
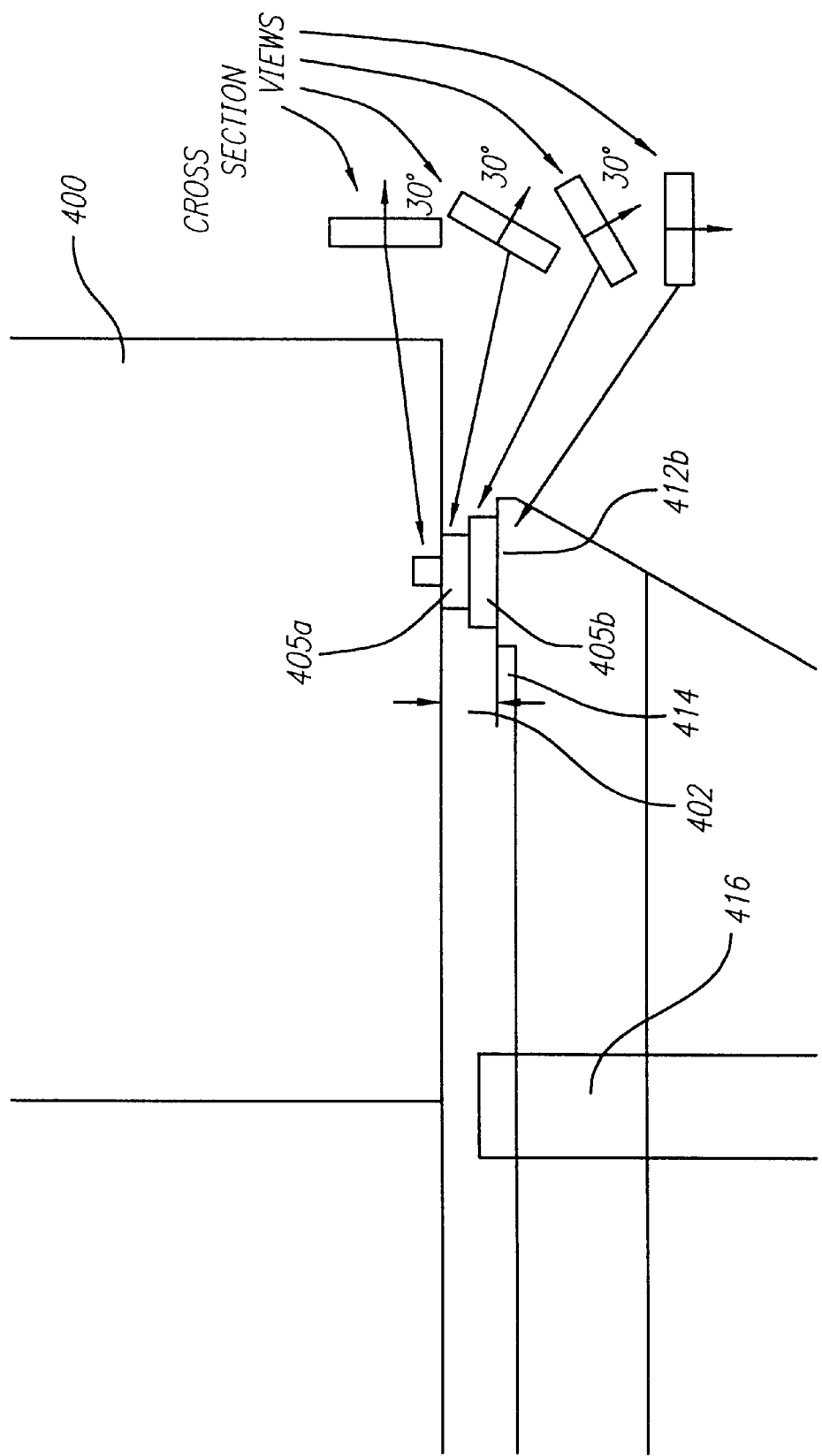
FIG. 7(c) shows a cross view of an example counter-clockwise rotation of the microwave signal polarization of the microwave digital radio of FIG. 3.

Referring next to FIG. 7(c), the rotation of the microwave signals polarization may be understood in even greater detail. FIG. 7(c) shows a counter clockwise rotation of the polarization. The linear polarization shifts 30 degrees for each of the following: the top portion 405a of the waveguide port 405 of the mounting plate 402; the bottom portion 405b of the waveguide port 405 of the mounting plate 402; and the top of the waveguide transformer 412b of the interface slot 414.

Referring next to FIG. 8, the waveguide transformer 412b reorients the polarization of the microwave signal 90 degrees from a vertical to a horizontal plane so that energy may be coupled through the diplexer 406 In particular, FIG. 8 shows the polarization before and after the 90 degree orientation. As shown, the linear polarization of the TX microwave signal is at 270 degrees if rotated counterclockwise, and at 90 degrees if rotated clockwise.

Referring next to FIG. 9, the reorientation of the polarization of the waveguide signal at the waveguide transformer 412b may be understood in greater detail. Because of the 45° beveled angle of the waveguide transformer 412b, the cross sectional dimensions of the waveguide transformer 412b remain constant throughout. More particularly, FIG. 9 shows the "electric field" (E) and "magnetic field" (H) rotation due to the 45° bend transition at the waveguide transformer 412b. Waveguide transformer 412a (not shown) provides the E and H rotation equal in magnitude to that provided by waveguide transformer 412b.

Once a waveguide transformer (412a, 412b) reorients the polarization of the TX microwave signal, the energy is coupled through the third waveguide port 407 to the waveguide inlet 416, through the nipple interface port 500 to the antenna 420. Before the nipple interface port 600 outputs the energy of the microwave signal to the antenna 420, a linear transition from a rectangular to a circular waveguide occurs (not shown). One skilled in the art will understand that the process of rotating and reorienting the polarization of the RX microwave follows the steps described herein above but in reverse. Further, alternative embodiments of the invention may assign either waveguide transformer (412a or 412b) to reorient either the TX or RX signal.

It can therefore be appreciated that a new and novel digital microwave radio has been described. It will be appreciated by those skilled in the art that, given the teaching herein, numerous alternatives and equivalents will be seen to exist which incorporate the invention disclosed hereby. As a result, the invention is not to be limited by the foregoing exemplary embodiments, but only by the following claims.

We claim:

1. A digital microwave radio that facilitates selection of an operating frequency and bandwidth, the radio comprising:

a transceiver;

a diplexer integrally mounted within the radio and externally positioned in relation to the transceiver such that selecting an operating bandwidth and frequency of the digital microwave radio occurs subsequent to complete manufacture of the digital microwave radio; and an interface having a slot and being externally positioned in relation to the transceiver, wherein each end of the slot includes a waveguide transformer, the diplexer having dimensions for insertion within the slot, wherein one of the waveguide transformers geometrically reorients polarization of a microwave signal so that energy is coupled through the diplexer.

2. The radio as recited in claim 1 further comprises:

a mounting plate including a co-planar and parallel transmitter and receiver waveguide ports, wherein the transceiver includes a receiver input and transmitter output port mounted to the mounting plate in a position aligned to the transmitter and the receiver waveguide ports for coupling microwave signals to and from the transceiver.

3. The radio as recited in claim 2, wherein the transmitter and receiver waveguide ports each include a top and bottom portion, wherein an offset position of the top portion of one of the waveguide ports rotates the polarization of the microwave signal, wherein an offset position of the top portion to the bottom portion of one of the waveguide ports further rotates the polarization of the microwave signal, wherein the top of one of the waveguide transformers further rotates the polarization of the microwave signal.

4. The radio as recited in claim 3,
wherein the offset position of the transceiver to the top portion of one of the waveguide ports is 30 degrees and the resulting polarization rotation of the microwave signal is 30 degrees,
wherein an offset position of the top portion of one of the top portion to the bottom portion of one of the waveguide ports is 30 degrees and the resulting further polarization rotation of the microwave signal is 30 degrees,
wherein the further polarization rotation of the microwave signal caused by the top of one of the waveguide transformers is 30 degrees.

5. The radio as recited in claim 2, wherein the mounting plate has a thickness of 0.375 inches.

6. The radio as recited in claim 2, wherein the transmitter and the receiver waveguide parts are WR22 waveguide ports.

7. The radio as recited in claim 1 wherein the geometric reorientation of the polarization of the microwave signal caused by one of the waveguide transformers is 90 degrees.

8. The radio as recited in claim 1, wherein the diplexer includes resonating screws, where the dimensions of the diplexer and a number, a type and a positioning of the resonating screws installed therein establishes the operating bandwidth and frequency of the diplexer.

9. The radio as recited in claim 8, wherein the number of resonating screws installed within the diplexer is eight, where four screws tune a transmit frequency and the other four screws tune a receive frequency.

10. The radio as recited in claim 1,
wherein the diplexer includes three waveguide ports, one waveguide port on each end of the diplexer and a third waveguide port along a side of the diplexer, the diplexer being inserted into the slot so that the third waveguide port aligns with a waveguide port of the interface.

11. The radio as recited in claim 1, where each waveguide transformer is formed by a beveled angle of 45 degrees.

12. The radio as recited in claim 1, further includes an antenna connected to the interface with a plurality of clip retainers.

13. The radio as recited in claim 12, wherein the interface includes a nipple interface port for sending a signal microwave to the antenna and receiving a signal microwave from the antenna.

14. A method for selecting an operating bandwidth and frequency of a digital microwave radio comprising the steps of:
manufacturing a digital microwave radio having a transceiver;
tuning a diplexer integrally mounted within the radio and externally mounted in relation to the transceiver; and
geometrically reorienting the polarization of a microwave signal to couple energy of the microwave signal through the diplexer.

15. The method as recited in claim 14, wherein the manufacturing step further including the step of:
mounting the transceiver having a receiver input and transmitter output port to a mounting plate including a co-planar and parallel transmitter and receiver waveguide ports, wherein the receiver input and transmitter output port are correspondingly aligned in a position to the transmitter and the receiver waveguide ports for coupling a microwave signal to and from the transceiver.

16. The method as recited in claim 15 further including the steps of:
rotating the polarization of the microwave signal to couple energy of the microwave signal through the digital microwave radio,
wherein the transmitter and receiver waveguide ports each include a top and bottom portion;
wherein an offset position of the transceiver to a top portion of one of the waveguide ports rotates the polarization of the microwave signal,
wherein an offset position of the top portion to the bottom portion of one of the waveguide ports further rotates the polarization of the microwave signal,
wherein a top of one of the waveguide transformers further rotates the polarization of the microwave signal.

17. The method as recited in claim 16,
wherein the offset position of the transceiver to the top portion of one of the waveguide ports is 30 degrees and the resulting polarization rotation of the microwave signal is 30 degrees,
wherein an offset position of the upper portion to the bottom portion of one of the waveguide ports is 30 degrees and the resulting further polarization rotation of the microwave signal is 30 degrees,
wherein the further polarization rotation of the microwave signal caused by the top of one of the waveguide transformers is 30 degrees.

18. The method as recited in claim 15, further including the step of:
inserting the diplexer into a slot of an interface wherein each end of the slot includes a waveguide transformer.

19. The method as recited in claim 15, further including the step of:
coupling a microwave signal from the transmitter through the waveguide port of the mounting plate to the waveguide transformer, through a side waveguide port of the diplexer, through an end waveguide port of the diplexer, through a waveguide inlet of the interface, through a nipple interface port and lastly exiting from an antenna.

20. The method as recited in claim 15, further including the step of:
coupling the microwave signal from an antenna through a nipple interface port, through a waveguide inlet of the interface, through a side waveguide port of the diplexer, through an end waveguide port of the diplexer, to the wave guide transformer and through the waveguide port of the mounting plate to the receiver.

21. The method as recited in claim 14, wherein reorienting the polarization of the microwave signal occurs in a clockwise direction.

22. The method as recited in claim 14, wherein reorienting the polarization of the microwave signal occurs in a counter-clockwise direction.

23. A method of rotating the polarization of a microwave signal to couple energy of the microwave signal from a transmitter through a digital microwave radio, the method comprising the steps of:
rotating the polarization by a first plurality of degrees with an offset position between a transmitter port and a top portion of a waveguide port of a mounting plate;

rotating the polarization by a second plurality of degrees with an offset position between the top portion of the waveguide port of the mounting plate and a bottom portion of the waveguide port of the mounting plate; and rotating the polarization by a third plurality of degrees with the top of a waveguide transformer.

24. The method of claim 23, wherein the first plurality of degrees and the offset position between a transmitter port and a top portion of the waveguide port of the mounting plate are each 30 degrees;

wherein the second plurality of degrees and the offset position between the top portion of the waveguide port of the mounting plate and the bottom portion of the waveguide port of the mounting plate are each 30 degrees; and wherein the third plurality of degrees is 30 degrees and the top of the waveguide transformer is a beveled angle of 45 degrees.

25. A method of rotating the polarization of a microwave signal to couple energy of the microwave signal through a digital microwave radio to a receiver, the method comprising the steps of:

rotating the polarization by a first plurality of degrees with the top of a waveguide transformer;

rotating the polarization by a second plurality of degrees with an offset position between a bottom portion of a waveguide port of the mounting plate and a top portion of the waveguide port of the mounting plate; and rotating the polarization by a third plurality of degrees with an offset position between the top portion of a waveguide port of a mounting plate and a transmitter port.

26. The method of claim 25, wherein the first plurality of degrees is 30 degrees and the top of the waveguide transformer is a beveled angle of 45 degrees;

wherein the second plurality of degrees and the offset position between the top portion of the waveguide port of the mounting plate and the bottom portion of the waveguide port of the mounting plate are each 30 degrees; and wherein the third plurality of degrees and the offset position between a transmitter port and a top portion of the waveguide port of the mounting plate are each 30 degrees.

* * * * *